Sept. 18, 1934.     D. C. McCARTHY     1,973,926
BREAD AND METHOD OF MAKING THE SAME
Original Filed March 23, 1932
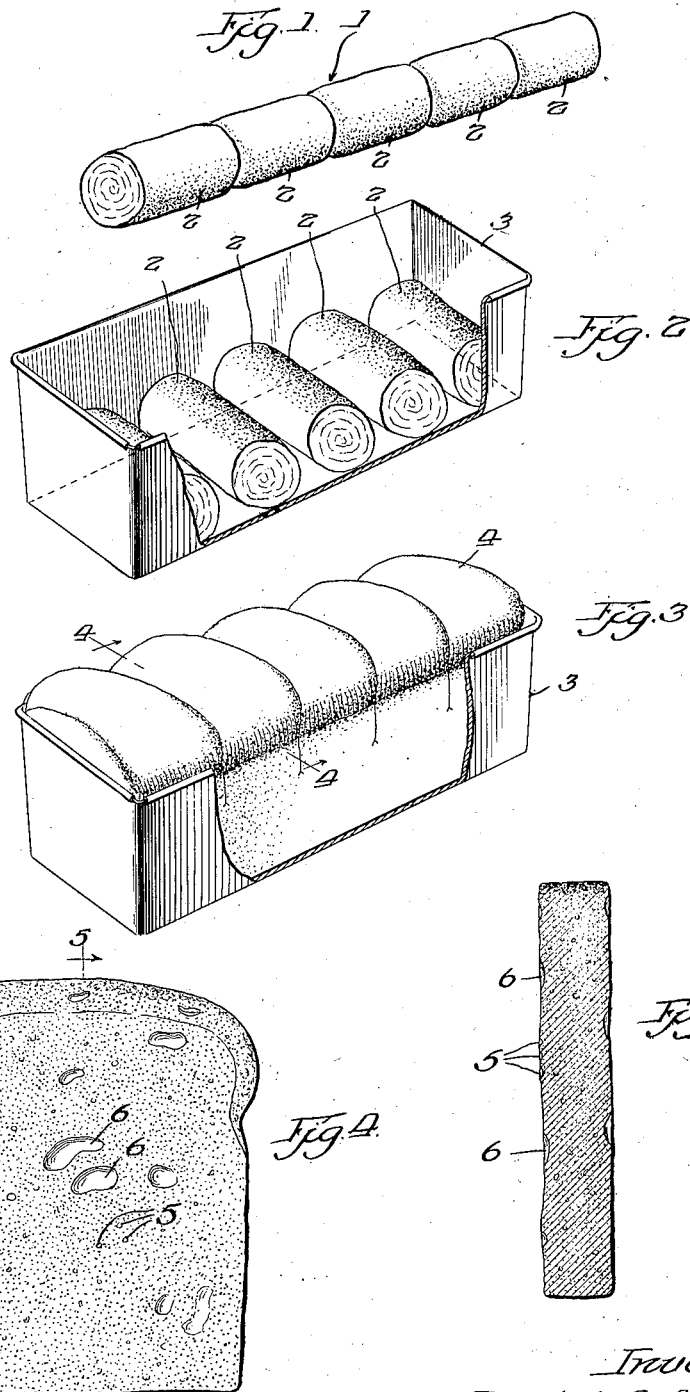
Inventor:
Daniel C. McCarthy
By Ira J. Wilson Atty
Witness:
R. B. Davison Patented Sept. 18, 1934

1,973,926

UNITED STATES PATENT OFFICE 1,973,926

BREAD AND METHOD OF MAKING THE SAME

Daniel C. McCarthy, Evanston, Ill., assignor to Purity Bakeries Service Corporation, Chicago, Ill., a corporation of Illinois Continuation of application Serial No. 600,628, March 23, 1932. This application November 14, 1933, Serial No. 697,981

12 Claims. (Cl. 107—54)

This invention (for which the present application is filed as a continuation of my application Serial No. 600,628, filed March 23, 1932,) relates to pan bread and its purpose is to provide pan bread of superior qualities more particularly as to texture, strength, resistance to deterioration, and appearance.

Pan bread, to be satisfactory must have certain desired characteristics particularly as to the above qualities. That is, the texture must be uniform and devoid of large cells, it must have sufficient resistance to deformation to permit it to be readily sliced, must resist drying out, and the loaf must be of good appearance both as to color and contour.

Heretofore it has been the practice in making pan bread to first mould the prepared bread dough by forming it into a flat sheet and rolling the sheet into a tight roll, repeating these steps when necessary or desired, second, place one or more rolls in a pan with the length or axes of the roll or rolls parallel with the length of the pan, third, proof in the usual proofing box and fourth, bake in an oven wherein the dough is first further proofed by what is known as "oven spring".

A loaf of pan bread produced in this manner is subject to and usually does have one or more serious defects. For example, the baked loaf which in cross section is of the well known cellular construction or texture caused by fermentation has in addition enlarged air or gas cells distributed throughout the loaf and extending longitudinally of the loaf. These latter cells frequently are of such length and are so disposed as to extend entirely through one or more cut slices. This not only weakens the structure of the bread so that it is difficult to slice but the cut slices crumble very easily. Furthermore the enlarged cells affect the resistance to drying and the color of the bread. That is, these large voids permit the inclusion of more air and also cause shadows, giving the bread the appearance of being darker than it really is.

These undesirable enlarged cells or voids are due to the air or gas cells in the dough entrapped between the layers of the roll of dough during the rolling of the sheet of dough. In proofing and baking the roll of dough tends to unroll as it rises and these entrapped cells enlarge in all directions particularly lengthwise of the roll because there is practically no restriction against expansion of the gas or air cells in this direction. The pan being relatively long and narrow there is less restriction to expansion of these entrapped cells in a direction parallel to the length of the pan than there is to expansion in a direction parallel to the width of the pan. On the other hand, the loaf rises in proofing and "oven spring" and the normal cells produced by fermentation expand in one common direction which aligns the cells in one definite direction resulting in a definite cell arrangement, "texture" or "grain" to the bread. This cell arrangement tends to increase the resistance of the loaf to deformation by stresses in a vertical direction but lessens the resistance to deformation by stresses in a lateral direction. The bread structure is therefore weakened by the regular arrangement of the cells which does not provide for equal resistance to deformation in all directions.

Various attempts have been made to minimize the number and size of the enlarged air cells as well as to vary the disposition thereof. For example, the Binger Patent No. 1,812,769, issued June 30, 1931, shows one of the more recent endeavors in this respect. So far as I am aware however, all prior attempts and improvements in pan bread in this respect have fallen short of solving the difficulties and accomplishing the results desired.

The foregoing defects may be eliminated and the desired results obtained to a substantial degree by, first, reducing the number of enlarged cells to a minimum; second, arranging the unavoidable enlarged cells so that their greatest dimension is parallel to the width of the loaf and not to the length thereof; and third, arranging all of the cells in such an irregular manner as to cause the loaf to offer substantially equal resistance to deformation in all directions. To accomplish the above and obtain the results desired I seal the piece of dough at several points throughout its length by cutting through the same, thereby dividing the loaf piece into a plurality of short pieces, which are placed in the pan transversely of the length thereof. One satisfactory arrangement is to place the pieces parallel to the width of the pan, i. e. at right angles to the length of the pan. The dough may be in the form of pieces or relatively short rolls.

A better understanding of my invention will be apparent from the more detailed description given in connection with the drawing which illustrates one embodiment only of my invention and in which:

Fig. 1 is a perspective view of a roll of dough sufficient to make one loaf of bread, the roll being cut or sealed at four points;

Fig. 2 is a perspective view of a pan illustrating one arrangement of the pieces of dough cut from the roll as shown in Fig. 1 and illustrates the dough ready to be proofed;

Fig. 3 is a perspective of a pan and loaf of bread therein after being baked;

Fig. 4 represents a slice of bread, the side of which appearing in the figure corresponds to a transverse section of the loaf taken approximately on the line 4—4 of Fig. 3.

Fig. 5 is a longitudinal section taken on line 5—5 of Fig. 4.

Referring more particularly to the drawing which illustrates only one embodiment of my invention, I have shown one manner in which the necessary amount of moulded dough, for making a loaf of pan bread, may be sealed and arranged in the pan so as to control the cell structure or texture of the loaf. The dough previously prepared and fermented in the usual manner is moulded, i. e., formed into a flat sheet and then rolled into a cylindrical roll of dough which after the complete rolling or moulding remains to some degree a helical laminated cylindrical roll having perceptible convolutions or layers. After moulding the roll is divided into the proper amount for a pan of bread in the usual manner. This amount of dough in the form of a roll 1 is further divided into a plurality of relatively shorter rolls 2 (Figs. 1 and 2) and placed in the pan 3.

In the illustrated form, as can be seen more particularly from Fig. 2, these rolls 2 are placed side by side in the pan, transversely of the length thereof. I have found that I obtain best results by cutting the sections or rolls 2 equal in length approximately to the width of the pan used. The cutting seals the ends of the cut rolls and closes any gas cells or voids in or between the layers or convolutions of the roll of dough, i. e., the cutting blade as it passes through the dough pulls the dough at the line of cut as shown in Fig. 1 and thereby closes or seals off the cells or voids due to the compressible tacky character of the dough. The cut pieces are arranged in the pan preferably in contact with each other and without any intervening medium or material with their longitudinal axes transverse to the length of the pan, preferably perpendicular thereto, that is, parallel with the width of the pan. The pan with the dough therein is proofed in the usual proofing manner during which step in the process the sides of the pan tend to hold and further seal the closed cut ends of the short rolls. The proofing, of course, is carried on for a relatively long period as is usual in pan bread making as distinguished from roll and biscuit making, and during proofing the fibers of the dough in the cut sections re-knit and weld together into one uniform mass, there being no intervening material between the pieces of dough. After being proofed the pieces of dough therein are placed in the baking oven and baked in the customary manner.

Similar results, although possibly not to such a marked degree, may be obtained by other arrangements or positioning of the pieces of dough in the pan if the pieces of dough are sealed as by cutting, i. e., the dough is not in the form of one or more continuous, uninterrupted rolls or pieces extending lengthwise of the pan. The ends of the relatively short rolls of dough may be rounded to further close the ends if desired. The resultant loaf will of course have an irregular top surface depending upon the manner in which the pieces of dough were placed in the pan.

Pan bread made in the manner just described involves no appreciable additional amount of labor and is superior in the following respects: The texture of the baked loaf of bread is materially improved in that texture is finer, i. e., the normal cells or voids indicated as 5, Figs. 4 and 5, caused by fermentation are smaller; the loaf is equally resistant to deformation in all directions making it easier to slice because the cells are not all arranged in a symmetrical manner but are irregularly and unsymmetrically arranged; the bread does not tend to dry out as rapidly as do breads of coarser texture; the contour of the cut slice is better, being more nearly square; the color of the cut slice appears to be much whiter due to the reduction and arrangement of large voids 6 (Figs. 4 and 5) caused by air or gas cells between the layers of the dough and which cast shadows on the surface of the cut slice; and cut slices are devoid of the enlarged voids 6 extending entirely through one or more slices because such voids as do exist have their major dimensions running parallel to the width of the pan instead of being parallel to the length of the pan.

The square shape and the resistance to deformation is particularly desirable in modern baking where the trend is toward the sliced loaf of bread. With the usual loaf of bread as heretofore made, the sides of the loaf curve inwardly so that the loaf immediately under the top is considerably narrower than the maximum width of the loaf. This, coupled with the cell structure of the usual loaf causes the usual loaf to collapse when being cut unless the knife is extremely sharp. A loaf of bread made in accordance with this invention, on the contrary has relatively little "overhang" of the top of the bread, therefore, the cut slice is nearer a perfect square and furthermore, due to the cell structure offers equal resistance against deformation in all directions. The loaf therefore does not tend to collapse or be deformed when cut.

I attribute the above improvements to the fact that during proofing, oven spring and baking the air and gas cells between the layers of rolled dough are sealed by the cutting of the long roll dough and are confined between the sides of the pan rather than between the ends of the pan and are, therefore, not permitted to expand as readily as if the roll of the dough were arranged with its longitudinal axis parallel with the length of the pan. In addition, unwinding of the rolls is restricted by contact with adjacent rolls. Furthermore, the dough being in relatively short rolls or pieces instead of being one or two relatively long and continuous rolls or pieces is more free to expand equally in all directions, that is, each piece of dough may expand radially in all directions instead of only in two directions. Consequently the texture may be said to be less regular and accordingly imparts an equal resistance to deformation in all directions. It will be manifest to those skilled in the art that the number of pieces of dough employed may be varied to suit various cases, that the angles at which the pieces of dough are placed may be varied and that other digressions from the foregoing description which is given by way of example may be made without departing from the spirit and scope of the invention as defined in the appended claims. The expression "inclined to the length of the pan" in certain of the claims signifies an arrangement either at right angles or at a lesser angle to the length of the pan.

What I claim as my invention, and desire to secure by Letters Patent, is:

1. The method of making a single loaf of pan bread in the form of a continuous elongated single loaf having substantially the same homogeneous texture throughout its entire length which consists in moulding bread dough into a relatively long slender piece, dividing the piece of moulded dough prior to proofing into a plurality of pieces to control the expansion of gas or air cells within the dough during proofing, arranging the divided pieces in a pan with the length of each piece inclined to the length of the pan, proofing the divided pieces in a single pan in contiguous relation without intervening substance a sufficient period of time to re-knit the dough fibers into one homogeneous mass, and baking the proofed dough.

2. The method of making a single loaf of pan bread in the form of a continuous elongated loaf having substantially the same homogeneous texture throughout its entire length which consists in moulding bread dough from a sheet into a relatively long slender roll, dividing the roll into a plurality of rolls prior to proofing to control the expansion of gas or air cells within the dough during proofing, arranging the rolls in a pan with the axis of each roll inclined to the length of the pan, and proofing the divided pieces in a single pan in contiguous relation a sufficient period of time to re-knit the dough fibers into one homogeneous mass, and baking the proofed dough.

3. The method of making a single loaf of pan bread in the form of a continuous elongated loaf having substantially the same homogeneous texture throughout its entire length which consists in moulding bread dough into a relatively long slender roll, cutting the roll transversely into a plurality of relatively shorter rolls to control expansion of the air or gas cells therein during proofing, placing the cut rolls in a pan in contact with each other and with their axes parallel to the width of the pan, and proofing the divided pieces of dough thus arranged in a single pan a sufficient period of time to re-knit the dough fibers into one homogeneous mass, and baking the proofed dough.

4. A loaf of pan bread of substantially uniform homogeneous texture throughout, the loaf being formed from distinct pieces of dough cut from a sheet of dough rolled into a relatively long roll, the pieces being turned with their major dimensions inclined to the length of the loaf, proofed and baked simultaneously in a single pan in contiguous relation and in which loaf the cells produced by fermentation are arranged non-uniformly whereby the loaf of bread is substantially equally resistant to compression in all directions and in which the enlarged voids produced by air or gas cells entrapped between layers of dough in one or more of the pieces of dough during treatment thereof are arranged with their maximum dimensions substantially perpendicular to the length of the loaf.

5. The method of making a single loaf of pan bread in the form of a continuous elongated loaf having substantially the same homogeneous texture throughout its entire length which consists in, molding bread dough into a relatively long slender roll having the grain or cell arrangement thereof extending longitudinally of the roll, cutting the roll transversely into a plurality of relatively shorter pieces and sealing off the air or gas cells within each piece, arranging the pieces in contact with each other in a pan with the grain of each piece inclined to the length of the pan, proofing the pieces of dough thus arranged in said pan a sufficient period of time so that the dough pieces become intimately united and merge into each other to form one homogeneous mass, and baking the proofed dough.

6. The method of making a pan-baked bread loaf in the form of a continuous elongated loaf having substantially the same homogeneous texture throughout its entire length, which consists in moulding bread dough into a relatively long slender roll having the grain or cell arrangement thereof extending longitudinally of the roll, cutting the roll transversely into a plurality of relatively shorter pieces, arranging the pieces in contact with each other in a pan with the grain of each piece crosswise of the length of the pan, proofing the pieces of dough thus arranged in said pan a sufficient period of time so that the dough pieces become intimately united and merge into each other to form one homogeneous mass, and baking the proofed dough.

7. The method of making a pan-baked bread loaf in the form of a continuous elongated loaf which consists in moulding bread dough into a roll having a longitudinally extending grain, dividing the roll of moulded dough before proofing by cutting the same transversely at a plurality of points along its length, panning the divided dough for baking in such manner that the dough pieces are arranged side by side in a single row in the baking pan with the grain of each piece crosswise of the length of the pan, proofing said pieces while so arranged in said pan in contiguous relation without intervening substance a sufficient period of time to cause the pieces to become united, and baking the proofed dough.

8. The method of making a pan-baked bread loaf in the form of a continuous elongated loaf which consists in moulding bread dough into a roll having the grain or cell arrangement thereof extending longitudinally of the roll, cutting the roll transversely into a plurality of relatively shorter pieces, arranging the pieces in contact with each other in a pan with the grain of each piece crosswise of the length of the pan, proofing the pieces of dough thus arranged in said pan a sufficient period of time so that the dough pieces become united in a single loaf, and baking the proofed dough.

9. The method of baking a single loaf of bread consisting in preparing dough and shaping the same into a loaf, cutting the loaf of dough transversely at predetermined intervals longitudinally thereof to form a plurality of separate segments, turning the segments at right angles, bringing the turned segments to adhering relation one to the other to form a composite loaf and baking the same together in a single pan to form a completed bread loaf.

10. The method of baking a single loaf of bread consisting in preparing a loaf of unbaked dough having longitudinally extending grain, severing the loaf of dough transversely at spaced intervals longitudinally thereof to form a plurality of separate segments, turning of the segments to a position to cause the grain of the dough to extend transversely of the loaf, positioning of the turned segments in adhering relationship one to the other and baking said loaf in an open pan to produce a loaf scored at predetermined intervals.

11. A loaf of bread formed of a plurality of initially separate segments of dough adhering to each other when baked to form a complete loaf of dough, each segment having the grain of the dough thereof extending in a direction substantially at right angles to the length of the loaf, the junction of the segments one to the other forming scored portions on the upper face of said loaf.

12. A pan-baked bread loaf in the form of a continuous elongated loaf having a finely grained honey-comb like structure and substantially the same homogeneous texture through its entire length and having its cell structure oriented in a direction transverse of the long axis of the loaf and being substantially devoid of a longitudinal grain, said loaf being an integrally united row of originally individual rolled dough bodies arranged with the grain of each body cross-wise of the length of the loaf.

DANIEL C. McCARTHY.